(12) United States Patent
Bayod et al.

(10) Patent No.: US 10,125,673 B2
(45) Date of Patent: Nov. 13, 2018

(54) VARIABLE NOZZLE UNIT AND VARIABLE GEOMETRY TURBOCHARGER

(71) Applicant: IHI Corporation, Koto-ku (JP)

(72) Inventors: Jose Javier Bayod, Tokyo (JP); Koutarou Itou, Tokyo (JP); Taiki Yoshizaki, Tokyo (JP); Tomohiro Inoue, Tokyo (JP); Kenji Bunno, Tokyo (JP); Takao Asakawa, Tokyo (JP); Ryota Sakisaka, Tokyo (JP); Kazuko Takeuchi, Tokyo (JP)

(73) Assignee: IHI Corporation, Koto-ku (JP)

( * ) Notice: Subject to any disclaimer, the term of this patent is extended or adjusted under 35 U.S.C. 154(b) by 49 days.

(21) Appl. No.: 15/348,602

(22) Filed: Nov. 10, 2016

(65) Prior Publication Data

US 2017/0058764 A1    Mar. 2, 2017

Related U.S. Application Data

(63) Continuation of application No. PCT/JP2015/066579, filed on Jun. 9, 2015.

(30) Foreign Application Priority Data

Jun. 13, 2014  (JP) .................................. 2014-122123

(51) Int. Cl.
*F02B 37/22* (2006.01)
*F02B 37/24* (2006.01)
*F01D 17/16* (2006.01)

(52) U.S. Cl.
CPC ............ *F02B 37/22* (2013.01); *F01D 17/165* (2013.01); *F02B 37/24* (2013.01);
(Continued)

(58) Field of Classification Search
CPC ............... F01D 17/165; F05D 2220/40; F05D 2250/14; F02B 37/22; F02B 37/24; Y02T 10/144
(Continued)

(56) References Cited

U.S. PATENT DOCUMENTS 6,543,994 B2 *  4/2003  Jinnai ................... F01D 17/165
                                                       415/150
8,727,711 B2 *  5/2014  Boning ................. F01D 17/165
                                                       415/164

(Continued)

FOREIGN PATENT DOCUMENTS

CN      1307171 A     8/2001
CN      1692214 A     11/2005
(Continued)

OTHER PUBLICATIONS

International Search Report dated Aug. 25, 2015 in PCT/JP2015/066579 filed on Jun. 9, 2015(with English Translation).
(Continued)

*Primary Examiner* — Patrick Maines
*Assistant Examiner* — Dapinder Singh
(74) *Attorney, Agent, or Firm* — Oblon, McClelland, Maier & Neustadt, L.L.P.

(57) ABSTRACT

In a variable nozzle unit, at a position located away from and opposed to a first nozzle ring in a right-left direction, a second nozzle ring is provided integrally with the first nozzle ring through multiple connecting pins arranged in a circumferential direction. An inner edge portion of a support ring is connected to the first nozzle ring by riveting of one end portions of the multiple connecting pins. Each pin hole in the support ring is formed into such a shape extending in a radial direction of the support ring. A washer is provided between a rim of each pin hole in the support ring and a rivet
(Continued)

head brought about by joining of the end portion of the corresponding connecting pin.

7 Claims, 10 Drawing Sheets

(52) U.S. Cl.
CPC ...... *F05D 2220/40* (2013.01); *F05D 2250/14* (2013.01); *Y02T 10/144* (2013.01)

(58) Field of Classification Search
USPC .............................................. 60/602, 605.2
See application file for complete search history.

(56) References Cited

U.S. PATENT DOCUMENTS

| | | | | |
|---|---|---|---|---|
| 8,763,393 | B2* | 7/2014 | Severin | F01D 17/165 415/158 |
| 8,979,508 | B2* | 3/2015 | Mailfert | F01D 17/16 415/164 |
| 2005/0252210 | A1* | 11/2005 | Shiraishi | F01D 17/165 60/602 |
| 2006/0188368 | A1 | 8/2006 | Jinnai et al. | |
| 2007/0180825 | A1 | 8/2007 | Fledersbacher et al. | |
| 2010/0290895 | A1 | 11/2010 | Ahrens | |
| 2014/0134015 | A1 | 5/2014 | Mailfert et al. | |

FOREIGN PATENT DOCUMENTS

| | | |
|---|---|---|
| JP | 59-58391 | 4/1984 |
| JP | 60-95118 U | 6/1985 |
| JP | 61-79819 | 4/1986 |
| JP | 6-26352 | 2/1994 |
| JP | 8-320004 | 12/1996 |
| JP | 2006-220053 | 8/2006 |
| JP | 2006-527322 A | 11/2006 |
| JP | 2008-509340 | 3/2008 |
| JP | 2009-180111 | 8/2009 |
| JP | 2009-243300 | 10/2009 |
| JP | 2009-243374 A | 10/2009 |
| JP | 2009-243375 A | 10/2009 |
| JP | 2009-243431 | 10/2009 |
| JP | 2010-19252 A | 1/2010 |
| JP | 2013-130116 | 7/2013 |

OTHER PUBLICATIONS

Written Opinion dated Aug. 25, 2015 in PCT/JP2015/066579 filed on Jun. 9, 2015.
Office Action dated Apr. 3, 2018 in corresponding Japanese Patent Application No. 2014-122123, 3 pages.
Combined Chinese Office Action and Search Report dated May 30, 2018 in Patent Application No. 201580030662.6 (with English translation of Categories of Cited Documents), 7 pages.

* cited by examiner

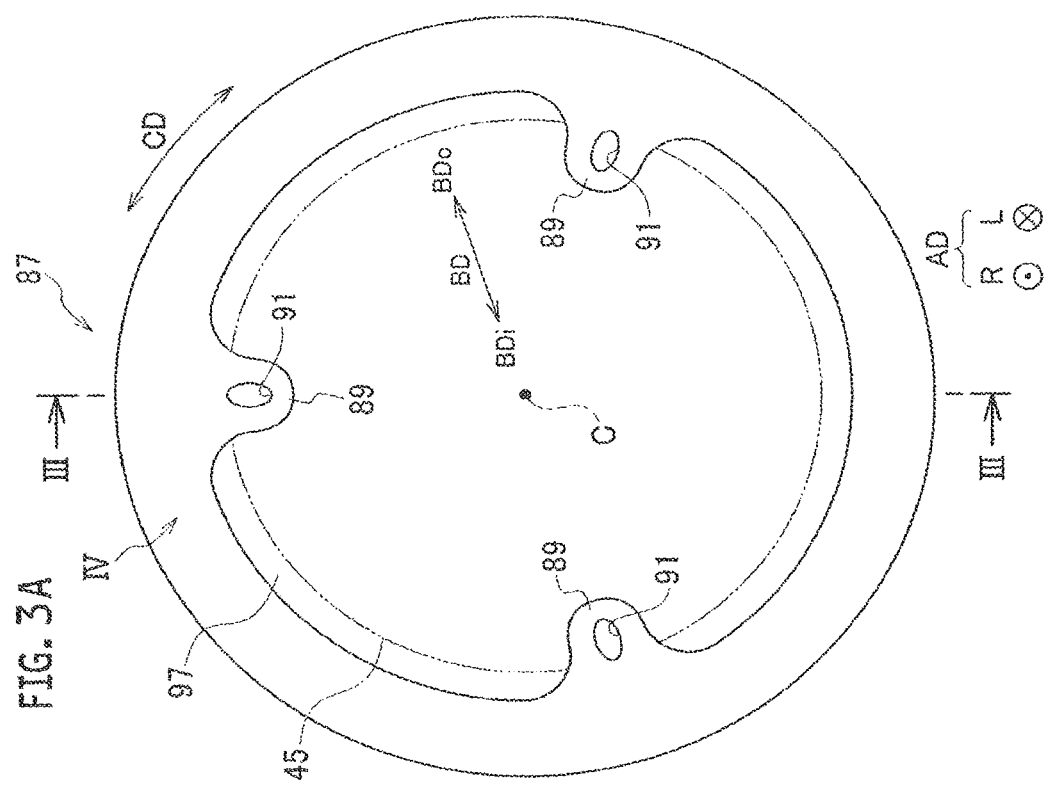
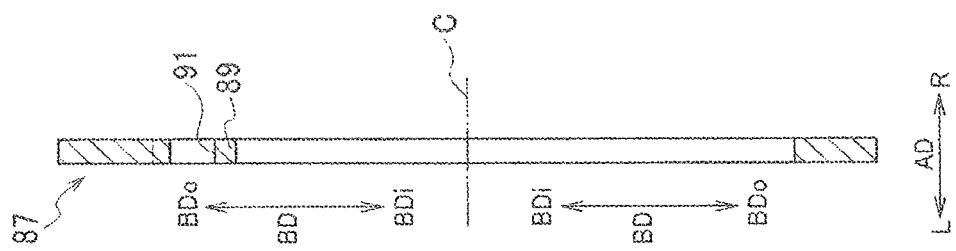

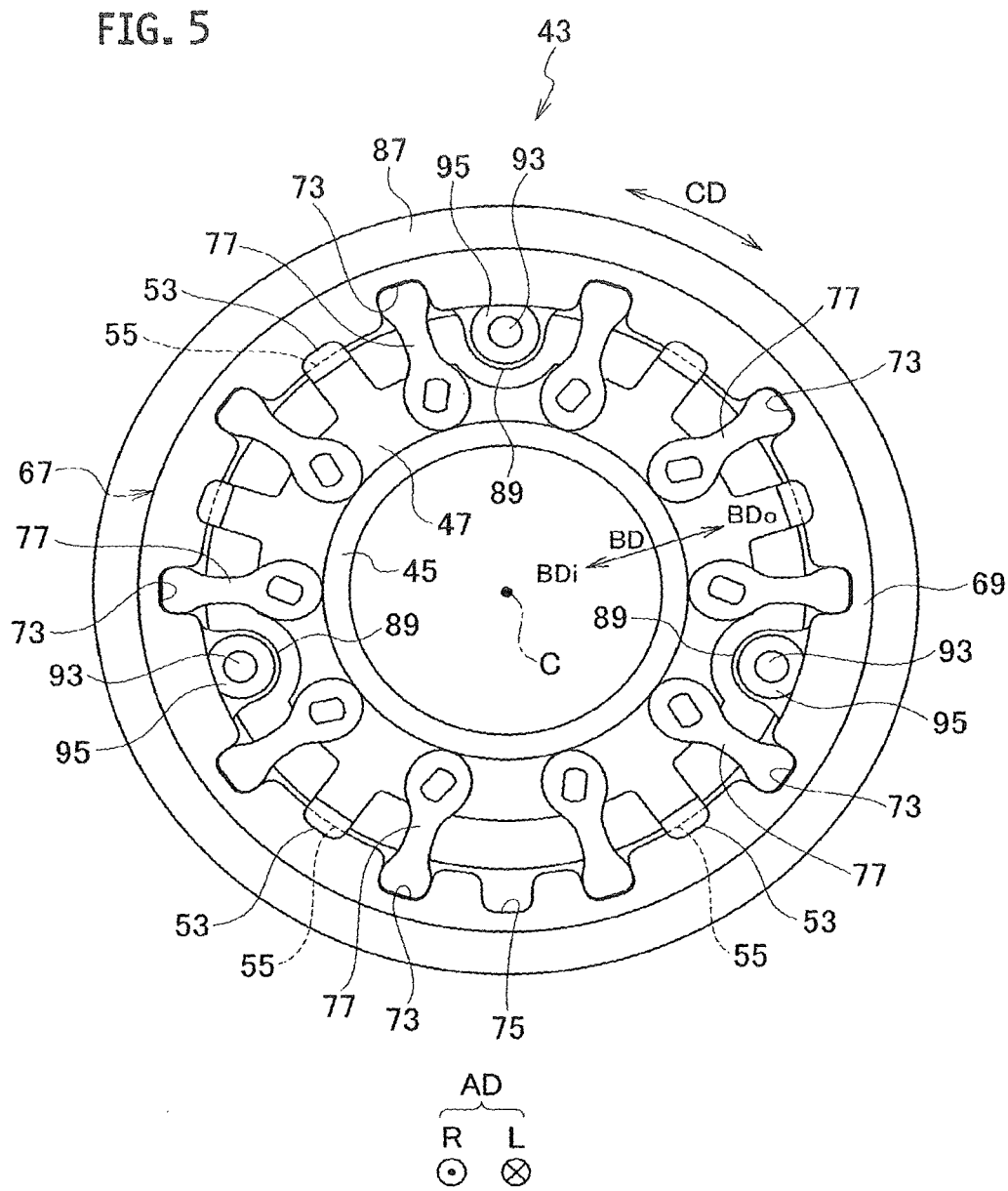

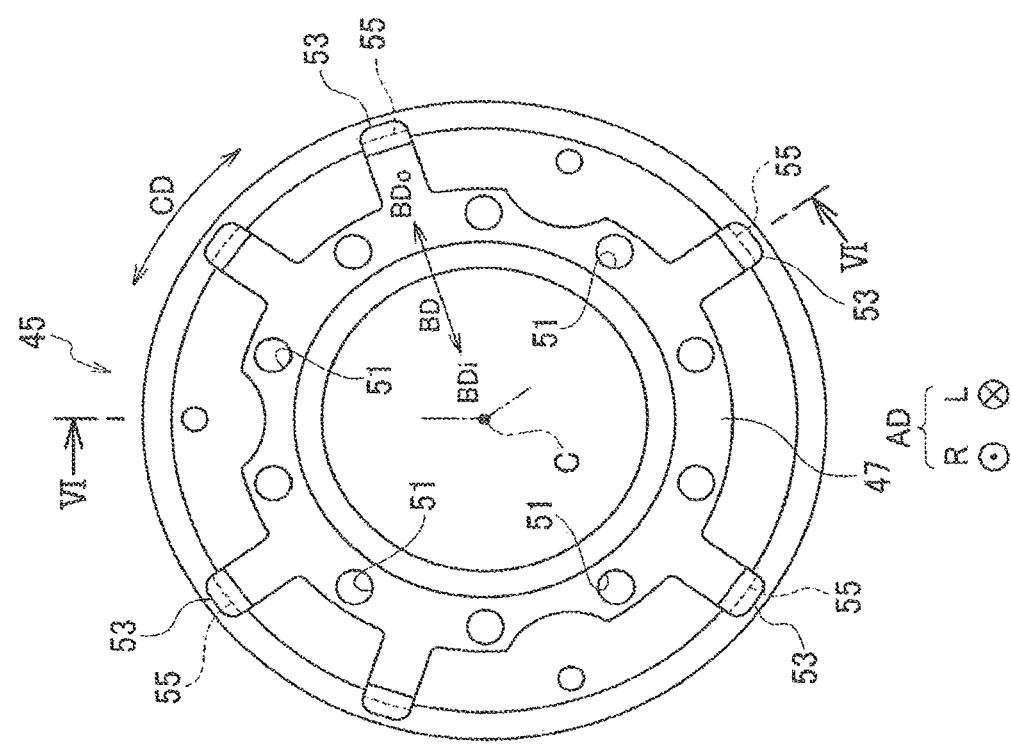

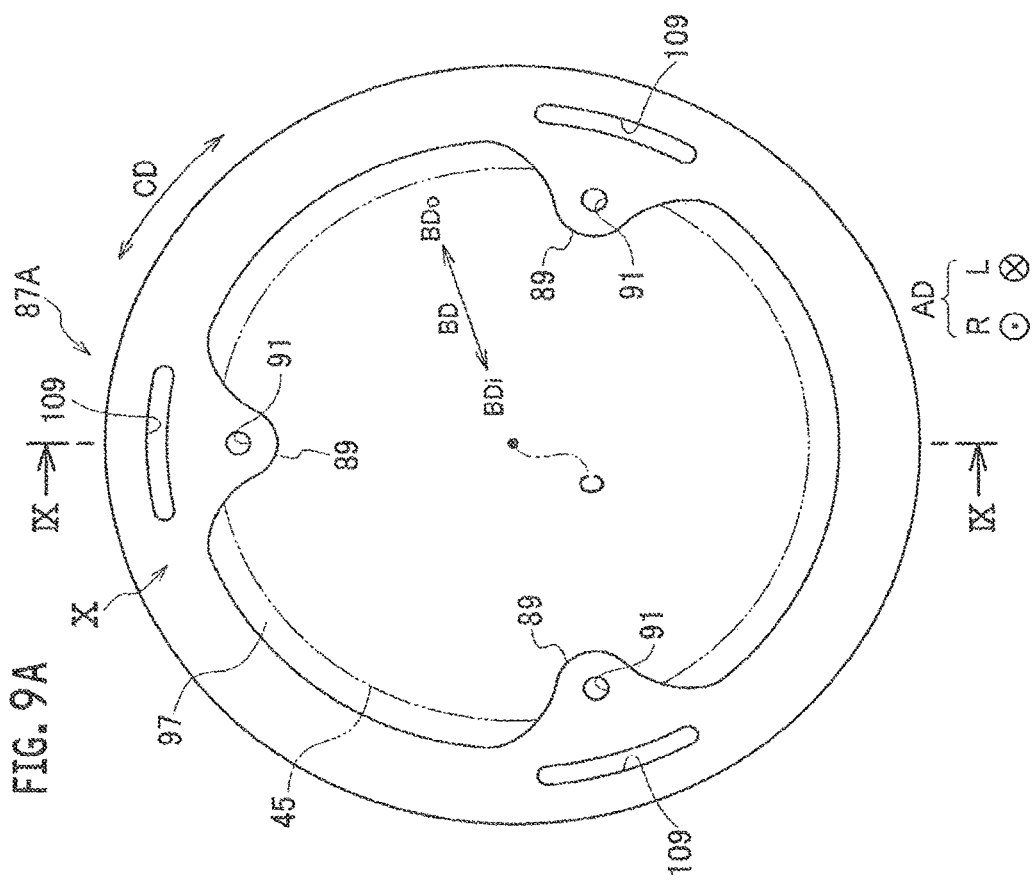

VARIABLE NOZZLE UNIT AND VARIABLE GEOMETRY TURBOCHARGER

CROSS REFERENCE TO RELATED APPLICATIONS

This application is a continuation application of International Application No. PCT/JP2015/066579, filed on Jun. 9, 2015 which claims priority to Japanese Patent Application No. 2014-122123, filed on Jun. 13, 2014 the entire contents of which are incorporated by reference herein.

BACKGROUND

1. Technical Field

The present disclosure relates to a variable nozzle unit and the like, which adjusts a passage area for (a flow rate of) an exhaust gas to be supplied to a turbine wheel side of a variable geometry turbocharger.

2. Description of the Related Art

In recent years, as described in Japanese Patent Application Publication No. 2009-243431 and Japanese Patent Application Publication No. 2009-243300, various developments have been made on a variable nozzle unit to be disposed inside a turbine housing of a variable geometry turbocharger. A specific configuration of a conventional variable nozzle unit is as described below.

Inside a turbine housing, a first nozzle ring serving as an annular first wall member is disposed concentrically with a turbine wheel. Meanwhile, a second nozzle ring serving as an annular second wall member is provided integrally with the first nozzle ring at a position away axially (in an axial direction of the turbine wheel) from the first nozzle ring, by using multiple connecting pins arranged at intervals in a circumferential direction (a predetermined circumferential direction) The first nozzle ring has a surface (an opposed surface) which is opposed to the second nozzle ring. Likewise, the second nozzle ring has a surface (an opposed surface) which is opposed to the first nozzle ring.

Multiple variable nozzles are disposed between the opposed surface of the first nozzle ring and the opposed surface of the second nozzle ring. The variable nozzles are disposed at regular intervals in the circumferential direction (the predetermined circumferential direction). Each variable nozzle is turnable in forward and reverse directions (opening and closing directions) around a shaft center (a shaft center of a nozzle shaft of the variable nozzle) which is parallel to a shaft center of the turbine wheel. Moreover, a link mechanism is disposed in a link chamber defined and formed on an opposite surface side from the opposed surface of the first nozzle ring. The link mechanism turns the multiple variable nozzles synchronously in the forward and reverse directions. A passage area (a throat area) for an exhaust gas to be supplied to the turbine wheel side is increased when the link mechanism turns the multiple variable nozzles synchronously in the forward direction (the opening direction). On the other hand, this passage area is reduced when the link mechanism turns the multiple variable nozzles synchronously in the reverse direction (the closing direction)

A support ring (an annular support member) having a diameter greater than an outside diameter of the first nozzle ring is provided on the opposite surface from the opposed surface of the first nozzle ring. Meanwhile, an inner edge portion (an inner peripheral edge portion) of the support ring is integrally connected by joining of one end portions of the multiple connecting pins. Multiple pin holes for allowing insertion of the one end portions of the connecting pins are penetratingly formed (formed in a penetrating manner) in the inner edge portion of the support ring at intervals in the circumferential direction (the predetermined circumferential direction). Furthermore, an outer edge portion (an outer peripheral edge portion) of the support ring is attached to a bearing housing in a sandwiched state in cooperation with the turbine housing.

SUMMARY

When the variable geometry turbocharger is in operation, an ambient temperature of the first nozzle ring (an ambient gas temperature) may become very high as compared to an ambient temperature of the support ring. In the meantime, the ambient temperature of the first nozzle ring may become low as compared to the ambient temperature of the support ring depending on the operating condition of the variable geometry turbocharger. In other words, a difference in ambient temperature (a difference in ambient gas temperature) between the first nozzle ring and the support ring may occur when the variable geometry turbocharger is in operation. In this case, the first nozzle ring is thermally deformed such that the opposed surface of the first nozzle ring is inclined with respect to a direction perpendicular to the axial direction due to a difference in thermal expansion (a difference in thermal deformation) in a radial direction between the first nozzle ring and the support ring. As a consequence, parallelism between the opposed surface of the first nozzle ring and the opposed surface of the second nozzle ring may be deteriorated depending on the operating condition of the variable geometry turbocharger, whereby a space between the opposed surface of the first nozzle ring and the opposed surface of the second nozzle ring may be reduced locally.

For this reason, the size of a nozzle side clearance is set so that the reliability of the variable nozzle unit and the variable geometry turbocharger can be secured while maintaining operational stability of the multiple variable nozzles. In the meantime, when the nozzle side clearance is set larger, turbine efficiency of the variable geometry turbocharger tends to decrease because of an increase in leakage flow from the nozzle side clearance. Here, the nozzle side clearance unit either a clearance between the opposed surface of the first nozzle ring and a side surface (a side surface on one side in the axial direction) of the variable nozzle, or a clearance between the opposed surface of the second nozzle ring and another side surface (a side surface on the other side in the axial direction) of the variable nozzle.

In other words, there is a problem of difficulty in ensuring the reliability of the variable geometry turbocharger and maintaining or improving the turbine efficiency of the variable geometry turbocharger with at the same time.

According to the present disclosure, it is possible to provide a variable nozzle unit and the like for a variable geometry system turbocharge, which is capable of maintaining and improving the turbine efficiency while ensuring the reliability.

According to a first technical aspect of the present disclosure, a variable nozzle unit configured to adjust a passage area for (a flow rate of) an exhaust gas to be supplied to a turbine wheel side of a variable geometry turbocharger includes: an annular first wall member disposed inside a turbine housing of the variable geometry turbocharger and concentrically with the turbine wheel; an annular second wall member provided integrally with the first wall member at a position located away from and opposed to the first wall member in an axial direction, by using multiple connecting pins arranged at intervals in a circumferential direction (a predetermined circumferential direction); multiple variable nozzles disposed between an opposed surface of the first wall member and an opposed surface of the second wall member at intervals in the circumferential direction (the predetermined circumferential direction), each variable nozzle being turnable in forward and reverse directions around a shaft center (a shaft center of a nozzle shaft of the variable nozzle) which is parallel to a shaft center of the turbine wheel; a link mechanism configured to synchronously turn the multiple variable nozzles; and a support ring (an annular support member) being connected to the first wall member by joining of one end portions of the multiple connecting pins, the support ring including multiple pin holes to allow insertion of the one end portions of the multiple connecting pins, respectively, the pin holes being penetratingly formed (formed in a penetrating manner) in at intervals in the circumferential direction, wherein the first wall member is equipped with absorbing unit for absorbing a difference in thermal expansion in a radial direction between the first wall member and the support ring (a difference between thermal expansion in the radial direction of the first wall member and thermal expansion in the radial direction of the support ring) when the variable geometry turbocharger is in operation.

As the absorbing unit, each pin hole in the support ring maybe formed into a shape extending from an inner edge portion side toward an outer edge portion side of the support ring. Additionally, as the absorbing unit, a slit may be formed at a position corresponding to each pin hole in the support ring.

It is to be noted that in the specification and claims of the present application, the expression "disposed" is intended to include a state of being disposed directly as well as a state of being disposed indirectly through a different member, and the expression "provided" is intended to include a state of being provided directly as well as a state of being provided indirectly through a different member. The "annular first wall member" and the "annular second wall member" may constitute part of the turbine housing. Meanwhile, the expression "axial direction" unit an axial direction of the turbine wheel (in other words, an axial direction of each of the first wall member, the second wall member, and the support ring) unless otherwise specified. The expression "joining" is intended to include riveting, welding, screwing, and the like. Further, the expression "radial direction" unit a radial direction of the turbine wheel (in other words, a radial direction of each of the first wall member, the second wall member, and the support ring) unless otherwise specified. In addition, the expression "position corresponding to each pin hole" is intended to include a radially outer side (an outer side in the radial direction) of each pin hole, a radially inner side (an inner side in the radial direction) of each pin hole, the vicinity of each pin hole, and the like.

According to the present disclosure, if the number of revolutions of the engine is in a high revolution range and a flow rate of the exhaust gas is high when the variable geometry turbocharger is in operation, the multiple variable nozzles are turned synchronously in the forward direction (an opening direction) while operating the link mechanism. Thus, a gas passage area (a throat area) for the exhaust gas to be supplied to the turbine wheel side is increased.

On the other hand, if the number of revolutions of the engine is in a low revolution range and the flow rate of the exhaust gas is low, the multiple variable nozzles are turned synchronously in the reverse direction (a closing direction) while operating the link mechanism. Thus, the gas passage area for the exhaust gas to be supplied to the turbine wheel side is reduced (ordinary operation of the variable nozzle unit).

If a difference in thermal expansion in the radial direction occurs between the first wall member and the support ring when the variable geometry turbocharger is in operation, the difference in thermal expansion can be absorbed by use of the absorbing unit. Thus, it is possible to sufficiently suppress thermal deformation of the first wall member such that an opposed surface of the first wall member is inclined with respect to a direction perpendicular to the axial direction (characteristic operation of the variable nozzle unit).

According to a second technical aspect of the present disclosure, a variable geometry turbocharger configured to supercharge the air to be supplied to the engine side by using energy of an exhaust gas from the engine includes the variable nozzle unit including the first technical aspect.

The second technical aspect achieves operation similar to the operation according to the first technical aspect.

According to the present disclosure, it is possible to sufficiently suppress the thermal deformation of the first wall member such that the opposed surface of the first wall member is inclined with respect to the direction perpendicular to the axial direction when the variable geometry turbocharger is in operation. Thus, a nozzle side clearance can be minimized while sufficiently securing parallelism between the opposed surface of the first wall member and the opposed surface of the second wall member when the variable geometry turbocharger is in operation. As a consequence, it is possible to maintain operational stability of the multiple variable nozzles, to secure reliability of the variable nozzle unit and the variable geometry turbocharger, and to reduce a leakage flow from the nozzle side clearance, thereby maintaining or improving turbine efficiency of the variable geometry turbocharger.

BRIEF DESCRIPTION OF DRAWINGS

FIG. 3A is a view showing a support ring in the variable nozzle unit according to the embodiment of the present disclosure.

FIG. 3B is a cross-sectional view taken along the line in FIG. 3A.

FIG. 5 is a view of the variable nozzle unit according to the embodiment of the present disclosure, which is observed from a link mechanism side.

FIG. 6A is a view showing a first nozzle ring in the variable nozzle unit according to the embodiment of the present disclosure.

FIG. 6B is a cross-sectional view taken along the VI-VI line in FIG. 6A.

FIG. 9A is a view showing a support ring in the variable nozzle unit according to the modified example of the embodiment of the present disclosure.

FIG. 9B is a cross-sectional view taken along the IX-IX line in FIG. 9A.

Figure 1:
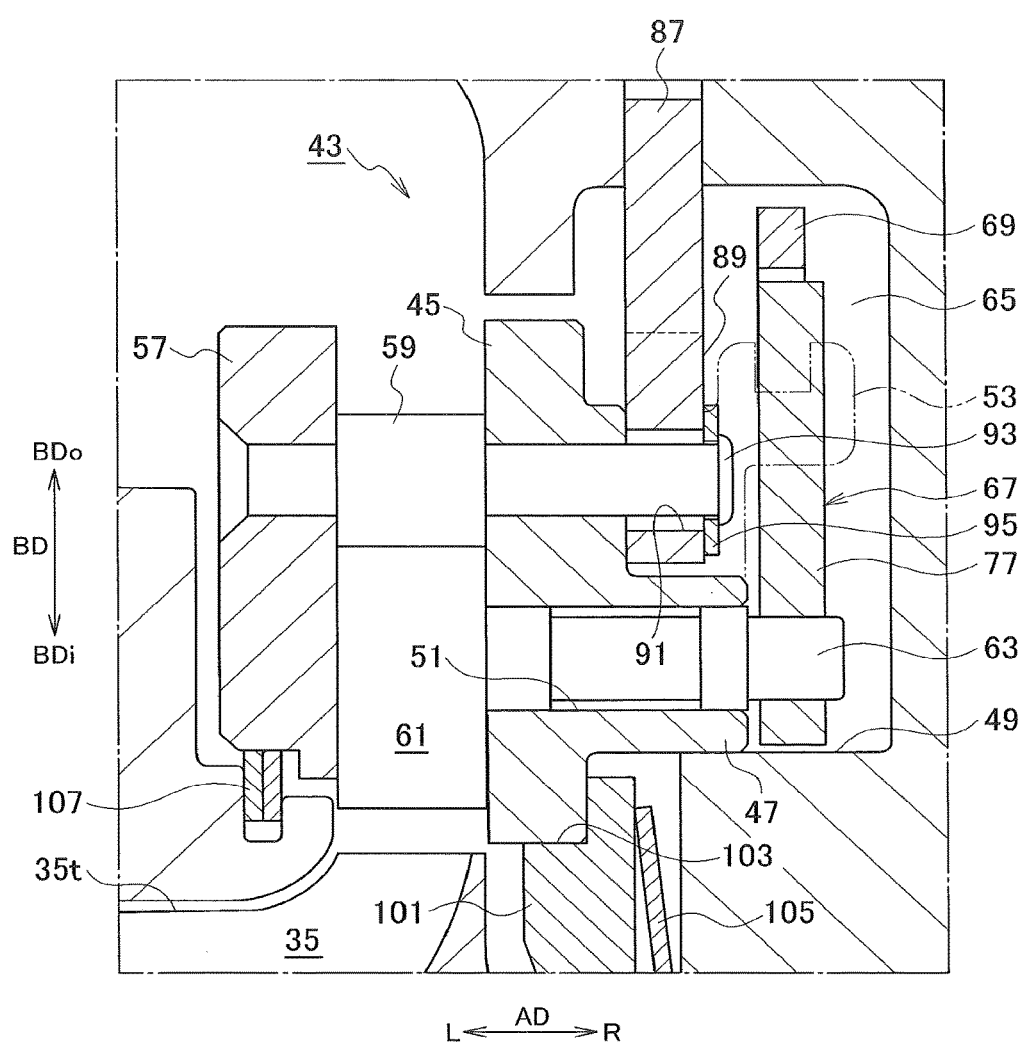
FIG. 1 is a cross-sectional view showing a substantial part of a variable nozzle unit according to an embodiment of the present disclosure, which is an enlarged cross-sectional view of a portion indicated with the arrow I in FIG. 2.

DETAILED DESCRIPTION OF THE EMBODIMENTS (Embodiment of Present Disclosure)

An embodiment of the present disclosure will be described with reference to FIG. 1 to FIG. 10. Here, as shown in the drawings, "L" represents a left direction, "R" represents a right direction, "AD" represents an axial direction, "BD" represents a radial direction, "BDi" represents an inner side in the radial direction, "BDo" represents an outer side in the radial direction, and "CD" represents a circumferential direction, respectively.

Figure 7:
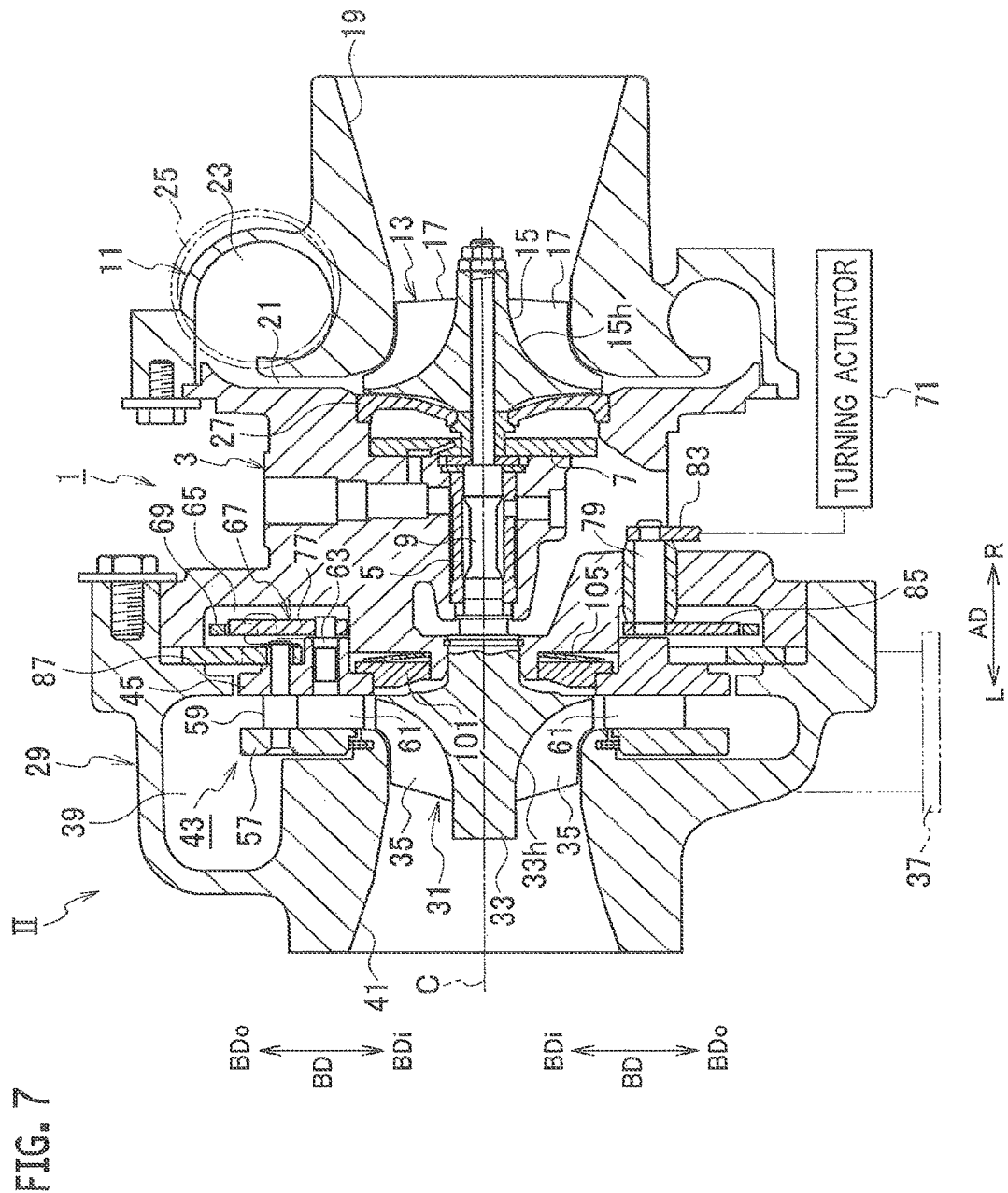
FIG. 7 is a front sectional view of a variable geometry turbocharger according to the embodiment of the present disclosure.

As shown in FIG. 7, a variable geometry turbocharger 1 according to an embodiment of the present disclosure is configured to supercharge (compress) air to be supplied to an engine (not shown) by using pressure energy of an exhaust gas from the engine. Here, a specific configuration and other features of the variable geometry turbocharger 1 are as described below.

The variable geometry turbocharger 1 includes a bearing housing 3. A pair of radial bearings 5 and a pair of thrust bearings 7 are provided inside the bearing housing 3. In addition, a rotor shaft (a turbine shaft) 9 extending in a right-left direction is rotatably provided to the multiple bearings 5 and 7. In other words, the rotor shaft 9 is rotatably provided to the bearing housing 3 through the multiple bearings 5 and 7.

A compressor housing 11 is provided on a right side of the bearing housing 3. A compressor wheel 13 configured to compress the air by using a centrifugal force is provided inside the compressor housing 11 in such a way as to be rotatable around its shaft center (a shaft center of the compressor wheel 13) C. This compressor wheel 13 is integrally connected to a right end portion of the rotor shaft 9. Meanwhile, the compressor wheel 13 includes a compressor disc 15. A hub surface 15h of the compressor disc 15 extends from the right side to a radially outer side (an outer side in a radial direction of the compressor wheel 13). Moreover, multiple compressor blades 17 are integrally formed on the hub surface 15h of the compressor disc at intervals in a circumferential direction (a circumferential direction of the hub surface 15h of the compressor disc 15).

An air intake port 19 for taking the air into the compressor housing 11 is formed on an inlet side (an upstream side in view of a mainstream direction of the air) of the compressor wheel 13 in the compressor housing 11. This air intake port 19 is connectable to an air cleaner (not shown) configured to cleanup the air. Meanwhile, an annular diffuser passage 21 configured to boost the compressed air is formed on an outlet side (a downstream side in view of the mainstream direction of the air) of the compressor wheel 13, which is located between the bearing housing 3 and the compressor housing 11. Moreover, a compressor scroll passage 23 in a scroll shape is formed inside the compressor housing 11. This compressor scroll passage 23 communicates with the diffuser passage 21. In addition, an air discharge port 25 for discharging the compressed air to the outside of the compressor housing 11 is formed at an appropriate position of the compressor housing 11. This air discharge port 25 is connectable to an air intake manifold (not shown) of the engine.

Here, an annular seal plate 27 configured to suppress leakage of the compressed air toward the thrust bearings 7 is provided on a right side portion of the bearing housing 3.

Figure 2:
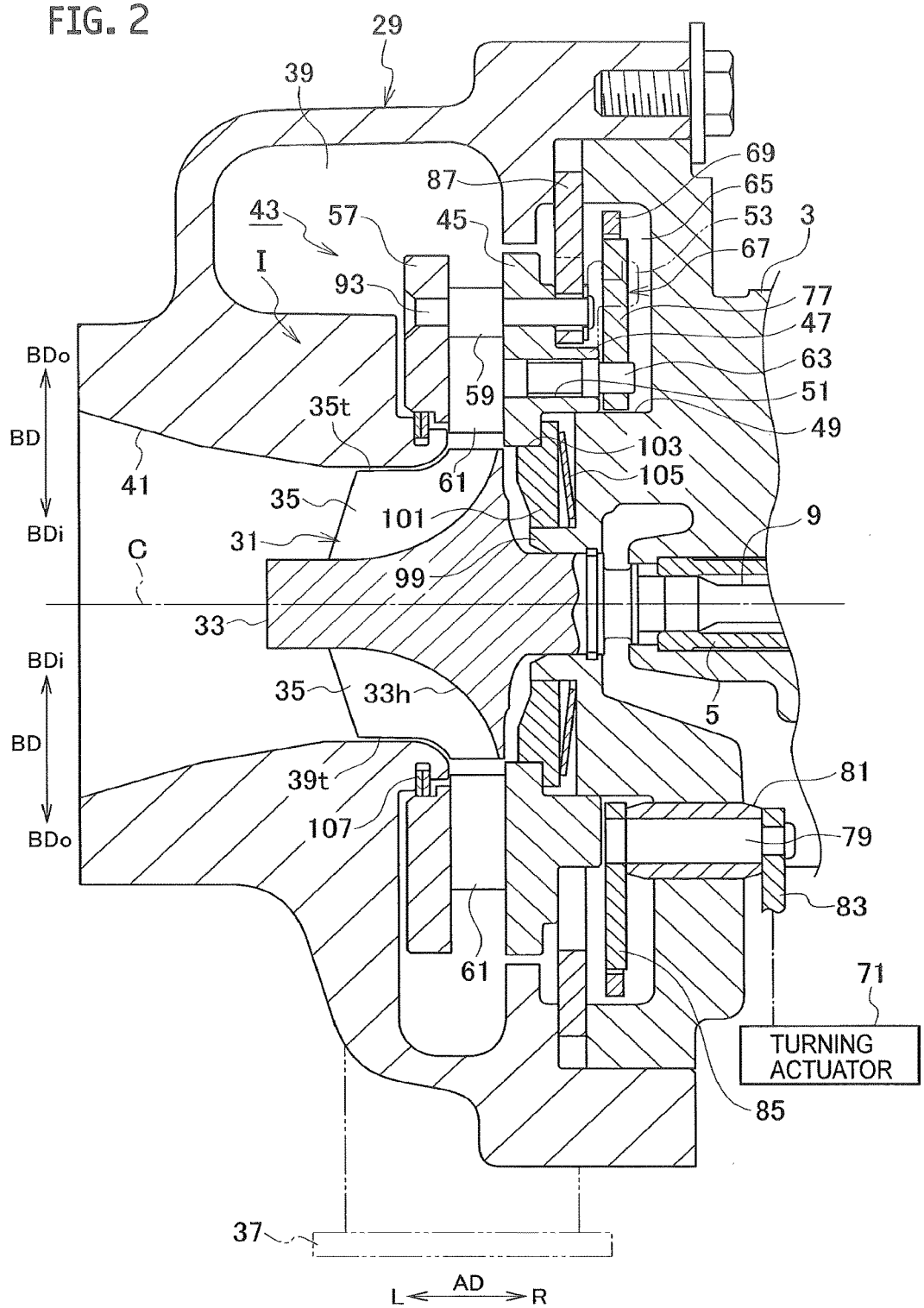
FIG. 2 is an enlarged cross-sectional view of a portion indicated with the arrow II in FIG. 7.

As shown in FIG. 2 and FIG. 7, a turbine housing 29 is provided on a left side of the bearing housing 3. A turbine wheel 31 configured to generate a rotative force by using the pressure energy of the exhaust gas is provided inside the turbine housing 29 in such a way as to be rotatable around its shaft center (a shaft center of the turbine wheel 31) C. This turbine wheel 31 is integrally connected to a left end portion of the rotor shaft 9. Meanwhile, the turbine wheel 31 includes a turbine disc 33. A hub surface 33h of this turbine disc 33 extends from the left side (one side in the axial direction) to an outer side in a radial direction (an outer side in a radial direction of the turbine wheel 31). Moreover, multiple turbine blades 35 are integrally formed on the hub surface 33h of the turbine disc 33 at intervals in a circumferential direction (a circumferential direction of the hub surface 33h of the turbine disc 33).

A gas intake port 37 for taking the exhaust gas into the turbine housing 29 is formed at an appropriate position of the turbine housing 29. This gas intake port 37 is connectable to an exhaust manifold (not shown) of the engine. Moreover, a turbine scroll passage 39 in a scroll shape is formed on an inlet side (an upstream side in view of a mainstream direction of the exhaust gas) of the turbine wheel 31 inside the turbine housing 29. This turbine scroll passage 39 communicates with the gas intake port 37. In addition, a gas discharge port 41 for discharging the exhaust gas is formed on an outlet side (a downstream side in view of a flowing direction of the exhaust gas) of the turbine wheel 31 in the turbine housing 29. This gas discharge port 41 is connectable to a catalyst (not shown) through a connecting pipe (not shown).

The variable geometry turbocharger 1 is equipped with a variable nozzle unit 43 configured to adjust a passage area for (a flow rate of) the exhaust gas to be supplied to the turbine wheel 31 side. Details of a configuration of this variable geometry turbocharger 1 are as described below.

As shown in FIG. 1, FIG. 2, and FIGS. 6A and 6B, inside the turbine housing 29, a first nozzle ring 45 serving as an annular first wall member is disposed concentrically with the turbine wheel 31. Moreover, an annular fitting projection 47 is formed on a right surface of the first nozzle ring 45 in such a way as to project rightward. This fitting projection 47 is supported in a state of being fitted into an annular support portion 49 formed on a left surface of the bearing housing 3. Further, multiple support holes 51 are penetratingly formed (formed in a penetrating manner) in the first nozzle ring 45 at regular intervals in a circumferential direction. In addition, multiple guide claws 53 are formed at intervals in a circumferential direction (a predetermined circumferential direction) on the fitting projection 47 of the first nozzle ring 45. Each guide claw 53 includes a guide groove 55 with a U-shaped cross section, which is located on a leading end side (an outer side in the radial direction).

As shown in FIG. 1 and FIG. 2, at a position located away from and opposed to the first nozzle ring 45 in a right-left direction (the axial direction of the turbine wheel 31), a second nozzle ring 57 serving as an annular second wall member is provided integrally and concentrically with the first nozzle ring 45 through multiple (at least three) connecting pins 59 arranged in a circumferential direction (a predetermined circumferential direction). Here, the multiple connecting pins 59 have a function to set a space between an opposed surface (a left surface) of the first nozzle ring 45 and an opposed surface (a right surface) of the second nozzle ring 57. Here, as shown in Japanese Patent Application Publication No. 2009-243431 and Japanese Patent Application Publication No. 2009-243300 discussed above, the second nozzle ring 57 may be provided with a cylindrical shroud portion (not shown) which covers tips 35t of the multiple turbine blades 35.

Multiple variable nozzles 61 are disposed between the opposed surface of the first nozzle ring 45 and the opposed surface of the second nozzle ring 57, and at regular intervals in a circumferential direction (a predetermined circumferential direction) in such a way as to surround the turbine wheel 31. Meanwhile, each variable nozzle 61 is turnable in forward and reverse directions (opening and closing directions) around a shaft center (a shaft center of the variable nozzle 61) which is parallel to the shaft center C of the turbine wheel 31. Moreover, a nozzle shaft 63 is integrally formed on a right surface (a side surface on one side in the axial direction) of each variable nozzle 61. Each nozzle shaft 63 is turnably supported by the corresponding support hole 51 in the first nozzle ring 45. Although the multiple variable nozzles 61 are arranged at regular intervals in the circumferential direction, the variable nozzles 61 may be arranged at irregular intervals instead. While each variable nozzle 61 is provided with one nozzle shaft 63, another nozzle shaft (not shown) may also be formed integrally on a left surface (a side surface on another side in the axial direction) of each variable nozzle 61. In this case, the other nozzle shafts will be turnably supported by other support holes (not shown) in the second nozzle ring 57, respectively.

An annular link chamber 65 is defined and formed on an opposite surface side (the right surface side) from the opposed surface of the first nozzle ring 45. A link mechanism 67 for turning the multiple variable nozzles 61 synchronously in the forward and reverse directions (the opening and closing directions) is disposed inside this link chamber 65. A specific configuration of the link mechanism 67 is as described below.

As shown in FIG. 1, FIG. 2, and FIG. 6, a drive ring 69 is provided to the guide grooves 55 of the multiple guide claws 53 of the first nozzle ring 45 in such a way as to be turnable in the forward and reverse directions around the shaft center C of the turbine wheel 31 (the shaft center of the first nozzle ring 45). Here, the drive ring 69 is configured to be turned in the forward and reverse directions by the drive of a turning actuator 71 such as an electric motor and a diaphragm actuator. Moreover, multiple (in the same number as the variable nozzles 61) engagement recesses (engagement portions) 73 are formed in the drive ring 69 in such a way as to be recessed outward in the radial direction and located at regular intervals in a circumferential direction (a circumferential direction of the drive ring 69). At an appropriate position of the drive ring 69, a different engagement recess (another engagement portion) 75 is formed in such a way as to be recessed outward in the radial direction. Moreover, base portions of nozzle link members 77 are integrally connected to the nozzle shafts 63 of the respective variable nozzles 61. A leading end portion of each nozzle link member 77 is engaged with the corresponding engagement recess 73 in the drive ring 69. Here, the drive ring may be provided turnably in the forward and reverse directions to a guide ring (not shown) disposed on the opposite surface from the opposed surface of the first nozzle ring 45 as shown in Japanese Patent Application Publication No. 2009-243431 and Japanese Patent Application Publication No. 2009-243300 instead of being provided turnably in the forward and reverse directions in the guide grooves 55 of the multiple guide claws 53 of the first nozzle ring 45. The link mechanism 67 may be disposed on an opposite surface side (a left surface side) from the opposed surface of the second nozzle ring 57 instead of being disposed on the opposite surface side (inside the link chamber 65) from the opposed surface of the first nozzle ring 45. If the multiple variable nozzles 61 are arranged at irregular intervals in the circumferential direction, then the multiple engagement recesses 73 will be arranged at irregular intervals.

A drive shaft 79 is provided at a left side portion of the bearing housing 3 in such a way as to be turnable through a bush 81 around a shaft center (a shaft center of the drive shaft 79) parallel to the shaft center of the turbine wheel 31. One end portion (a right end portion) of this drive shaft 79 is connected to the turning actuator 71 through a power transmission mechanism 83. In the meantime, a base end portion of a drive link member 85 is integrally connected to another end portion (a left end portion) of the drive shaft 79. A leading end portion of this drive link member 85 is engaged with the different engagement recess 75 in the drive ring 69.

As shown in FIG. 1, FIG. 2, and FIGS. 3A and 3B, a support ring (an annular support member) 87 having a diameter greater than an outside diameter of the first nozzle ring 45 is provided on the opposite surface (the right surface) from the opposed surface of the first nozzle ring 45. Moreover, an inner edge portion of the support ring 87 is connected to the first nozzle ring 45 by riveting of one end portions (right end portions) of the multiple connecting pins 59. In addition, multiple connecting pieces 89 to be connected to the first nozzle ring 45 are formed on the inner edge portion of the support ring 87 in such a manner as to project radially inward and at intervals in a circumferential direction (a circumferential direction of the support ring 87). A pin hole 91 for allowing insertion of a left end portion of the corresponding connecting pin 59 is penetratingly formed in each connecting piece 89. Moreover, an outer edge portion of the support ring 87 is attached to the bearing housing 3 in a state of being sandwiched in cooperation with the turbine housing 29. A displacement (slight movement) in the radial direction with respect to the bearing housing 3 is permitted. Here, the outer edge portion of the support ring 87 may be attached to the bearing housing 3 by using an attachment bolt (not shown) instead of being attached in the state of being sandwiched in cooperation with the turbine housing 29.

Figure 4A:
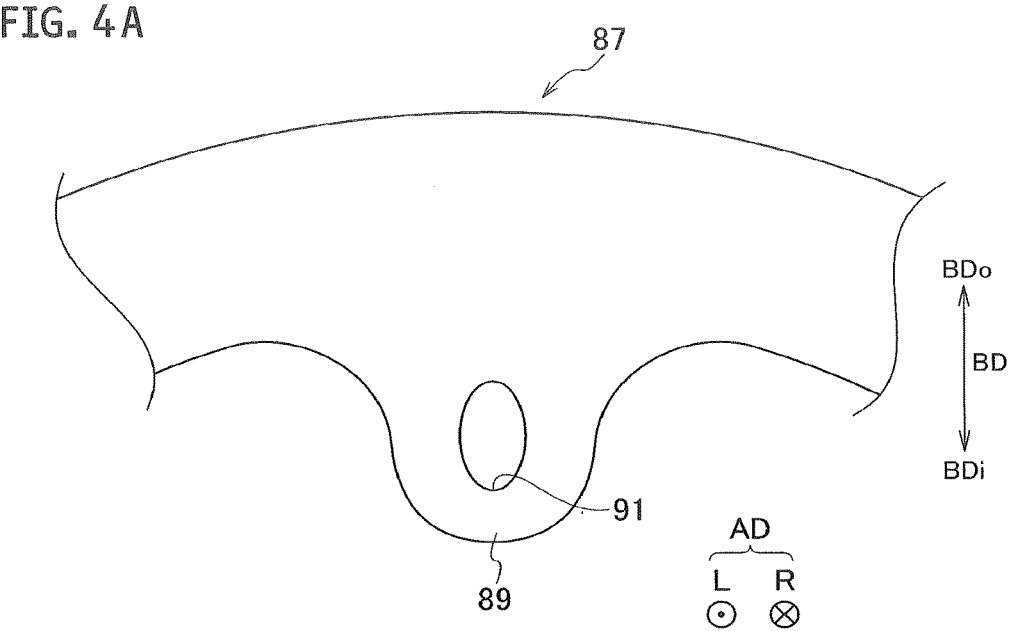
FIG. 4A is an enlarged view of a portion indicated with the arrow IV in FIG. 3A.
Figure 4B:
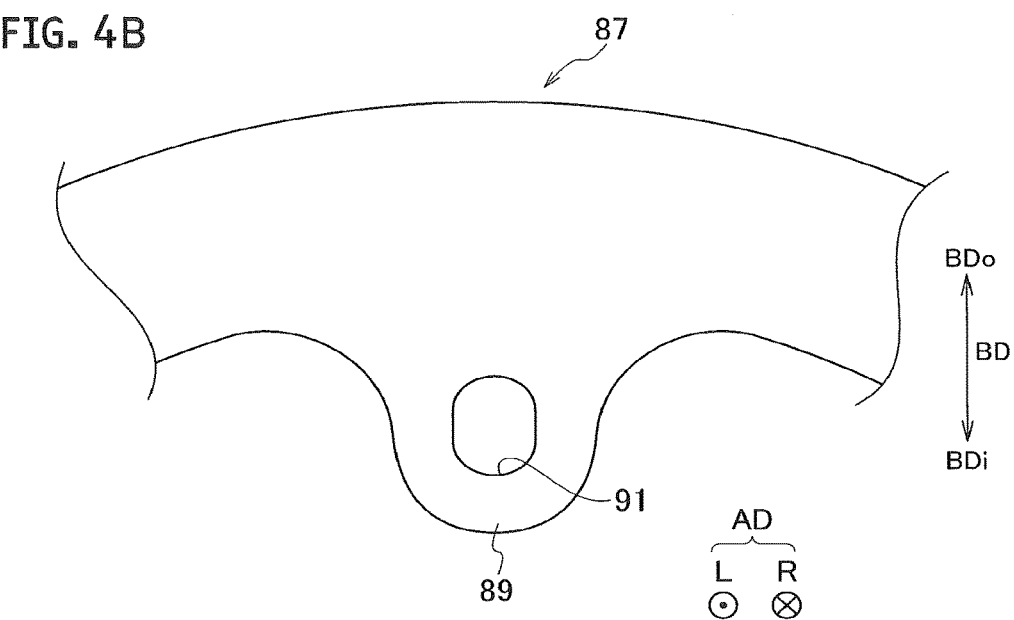
FIG. 4B is a view showing another aspect of the support ring in the variable nozzle unit according to the embodiment of the present disclosure.

As shown in FIG. 1, FIGS. 3A and 3B, and FIG. 4A, the support ring 87 is provided with absorbing unit for absorbing a difference in thermal expansion in the radial direction between the first nozzle ring 45 and the support ring 87 (a difference between thermal expansion in the radial direction of the first nozzle ring 45 and thermal expansion in the radial direction of the support ring 87) attributed to a difference in ambient temperature therebetween (a difference between a gas temperature around the first nozzle ring 45 and a gas temperature around the support ring 87) when the variable geometry turbocharger 1 is in operation. Specifically, each pin hole 91 in the support ring 87 (the pin hole 91 in each connecting piece 89) is formed into an elongated shape that extends in the radial direction of the support ring 87. The shape (opening shape) of each pin hole 91 in the support ring 87 exhibits an oval shape. Meanwhile, a washer 95 is provided between a rim of each pin hole 91 in the support ring 87 and a rivet head 93 (an example of a joining portion) brought about by joining of the one end portion of the corresponding connecting pin 59. Here, instead of having the shape of each pin hole 91 in the support ring 87 exhibit the oval shape, the pin hole 91 may be formed into an elongated hole shape with two parallel long sides as shown in FIG. 4B. In any case, the pin hole 91 is designed to have an elongated shape so as to function as the absorbing unit, with its main axis oriented in a direction (typically the radial direction BD) intersecting the circumferential direction CD. Although illustration is omitted, each pin hole 91 in the support ring 87 may be inclined with respect to the radial direction as long as the pin hole 91 extends from the inner edge portion side (an inner peripheral edge portion side) toward the outer edge portion side (an outer peripheral edge portion side) of the support ring 87. Furthermore, the washer 95 may take the shape of any of a circular shape, a quadrangular shape, and a triangular shape. An incision (a cut) may be provided to part of the washer 95. The washers 95 may be provided not only between the support ring 87 and the rivet heads 93 of the connecting pins 59, but also between the support ring 87 and the first nozzle ring 45.

As shown in FIG. 2 and FIGS. 3A and 3B, a discontinuous annular communication passage 97 is formed between the connecting pieces 89 adjacent to each other in a circumferential direction (a circumferential direction of the support ring 87) on an inner side (an inner peripheral surface side) of the support ring 87, so as to establish communication between the turbine scroll passage 39 and the link chamber 65. In other words, the opposite surface side (the right surface side) from the opposed surface of the first nozzle ring 45 communicates with the turbine scroll passage 39 through the communication passage 97 and the link chamber 65.

As shown in FIG. 2, an annular heat shield plate 101 to shield heat from the turbine wheel 31 side is provided and fitted to an annular projection 99, which is formed on an inner edge portion of the support portion 49 of the bearing housing 3 in such a way as to protrude leftward. Meanwhile, an annular fitting step portion 103 is formed on an outer edge portion (an outer peripheral edge portion) of the heat shield plate 101 in such a way as to recede inward in the radial direction. This fitting step portion 103 is fitted to an inner edge portion of the first nozzle ring 45. Moreover, on a right side of the heat shield plate 101 at the projection 99 of the bearing housing 3, there is provided a disc spring 105 configured to bias the first nozzle ring 45 leftward so as to pressure-bond (bring into contact while applying a pressure to) the fitting step portion 103 of the heat shield plate 101 and the inner edge portion of the first nozzle ring 45. Furthermore, multiple seal rings 107, which suppress leakage of the exhaust gas from the opposite surface side (the left surface side) from the opposed surface of the second nozzle ring 57, are provided between an inner peripheral surface of the second nozzle ring 57 and an appropriate position of the turbine housing 29.

Subsequently, the operation and effect of the embodiment of the present disclosure will be described.

The exhaust gas is taken in from the gas intake port 37 and flows from the inlet side to the outlet side of the turbine wheel 31 through the turbine scroll passage 39. In this way, a rotative force is generated by using the pressure energy of the exhaust gas, so that the rotor shaft 9 and the compressor wheel 13 can be rotated integrally with the turbine wheel 31. Thus, the air taken in from the air intake port 19 can be compressed and discharged from the air discharge port 25 through the diffuser passage 21 and the compressor scroll passage 23, and the air to be supplied to the engine can be supercharged (compressed) accordingly.

If the number of revolutions of the engine is high and a flow rate of the exhaust gas is high when the variable geometry turbocharger 1 is in operation, the multiple variable nozzles 61 are turned synchronously in the forward direction (the opening direction) while operating the link mechanism 67 by using the turning actuator 71. Thus, it is possible to supply a large amount of the exhaust gas by increasing the passage area (the throat area) for the exhaust gas to be supplied to the turbine wheel 31 side. On the other hand, if the number of revolutions of the engine is low and the flow rate of the exhaust gas is low, the multiple variable nozzles 61 are turned synchronously in the reverse direction (the closing direction) while operating the link mechanism 67 by using the turning actuator 71. Thus, it is possible to increase a flow velocity of the exhaust gas by reducing the passage area for the exhaust gas to be supplied to the turbine wheel 31 side, and to secure a sufficient work output from the turbine wheel 31. As a consequence, the turbine wheel 31 can generate the rotative force sufficiently and stably irrespective of whether the flow rate of the exhaust gas is high or low (ordinary operation of the variable geometry turbocharger 1).

Each pin hole 91 in the support ring 87 is formed so as to extend from the inner edge portion side toward the outer edge portion side of the support ring 87. Accordingly, if the difference in thermal expansion in the radial direction occurs between the first nozzle ring 45 and the support ring 87 when the variable geometry turbocharger 1 is in operation, each connecting pin 59 (the one end portion of the connecting pin 59) moves (slightly moves) relative to the support ring 87 and along the pin hole 91 in the corresponding connecting piece 89 of the support ring 87. In particular, since the washer 95 is provided between the rim of each pin hole 91 in the support ring 87 and the rivet head 93 of the corresponding connecting pin 59, it is possible to stabilize the movement of the connecting pin 59 relative to the support ring 87 or to stabilize a retention force of the support ring 87 by use of the connecting pins 59 in the above-mentioned case. Thus, it is possible to absorb the difference in thermal expansion in the radial direction between the first nozzle ring 45 and the support ring 87, and thus to sufficiently and stably suppress thermal deformation of the first nozzle ring 45 such that the opposed surface of the first nozzle ring 45 is inclined with respect to the direction perpendicular to the axial direction when the variable geometry turbocharger 1 is in operation.

Since the opposite surface side from the opposed surface of the first nozzle ring 45 communicates with the turbine scroll passage 39, it is possible to increase a pressure that acts on an end surface of the nozzle shaft 63 of each variable nozzle 61 when the variable geometry turbocharger 1 is in operation, thereby bringing each variable nozzle 61 closer to the opposed surface side of the second nozzle ring 57 (characteristic operation of the variable geometry turbocharger 1).

Therefore, according to the embodiment of the present disclosure, it is possible to sufficiently and stably suppress the thermal deformation of the first nozzle ring 45 such that the opposed surface of the first nozzle ring 45 is inclined with respect to the direction perpendicular to the axial direction when the variable geometry turbocharger 1 is in operation, and thus to minimize a nozzle side clearance as much as possible while sufficiently securing parallelism between the opposed surface of the first nozzle ring 45 and the opposed surface of the second nozzle ring 57 when the variable geometry turbocharger 1 is in operation. As a consequence, according to the embodiment of the present disclosure, it is possible to maintain operational stability of the multiple variable nozzles 61, to secure reliability of the variable nozzle unit 43 and the variable geometry turbocharger 1, and to reduce a leakage flow from the nozzle side clearance, thereby improving turbine efficiency of the variable geometry turbocharger 1.

Specifically, each variable nozzle 61 can be brought closer to the opposed surface side of the second nozzle ring 57 when the variable geometry turbocharger 1 is in operation. Thus, it is possible to suppress a leakage flow from a gap between the left surface of each variable nozzle 61 and the opposed surface of the second nozzle ring 57, and to stabilize a flow of the exhaust gas along portions near the tips 35*t* of the turbine blades 35 (portions extending from a mid-span side toward the tips 35*t*), thereby further improving the turbine efficiency of the variable geometry turbocharger 1.

(Modified Example of Embodiment of Present Disclosure)

Figure 8:
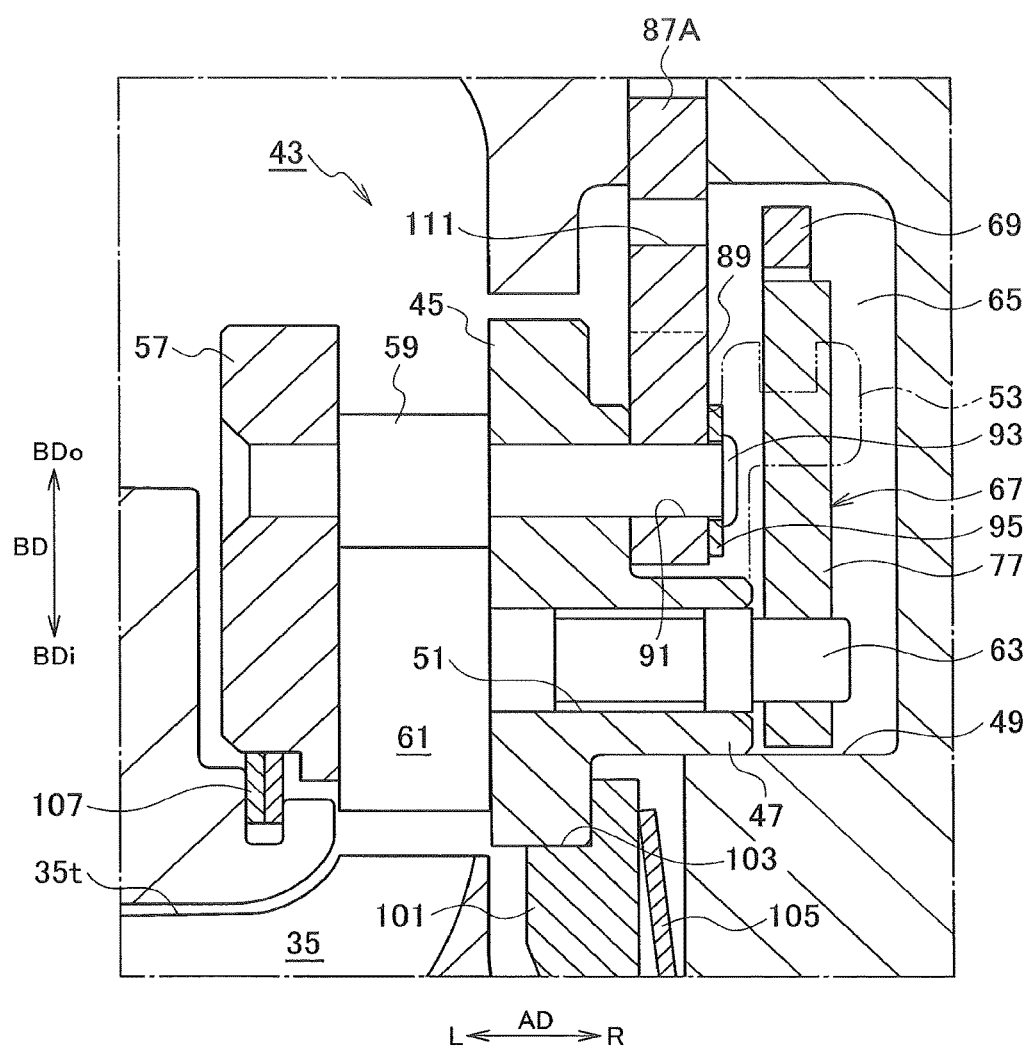
FIG. 8 is a cross-sectional view showing a substantial part of a variable nozzle unit according to a modified example of the embodiment of the present disclosure, which is a view corresponding to FIG. 1.

Instead of using the support ring 87 (see FIG. 1) as the constituent of the variable nozzle unit 43 (see FIG. 1), a different support ring 87A may be used as shown in FIG. 8. The support ring 87A has a configuration similar to that of the support ring 87. A description will be given below only of portions of a configuration of the support ring 87A which are different from those of the configuration of the support ring 87. Note that elements among multiple constituents in the support ring 87A which correspond to the elements among those in the support ring 87 will be denoted by the same reference signs in the drawings.

Figure 10A:
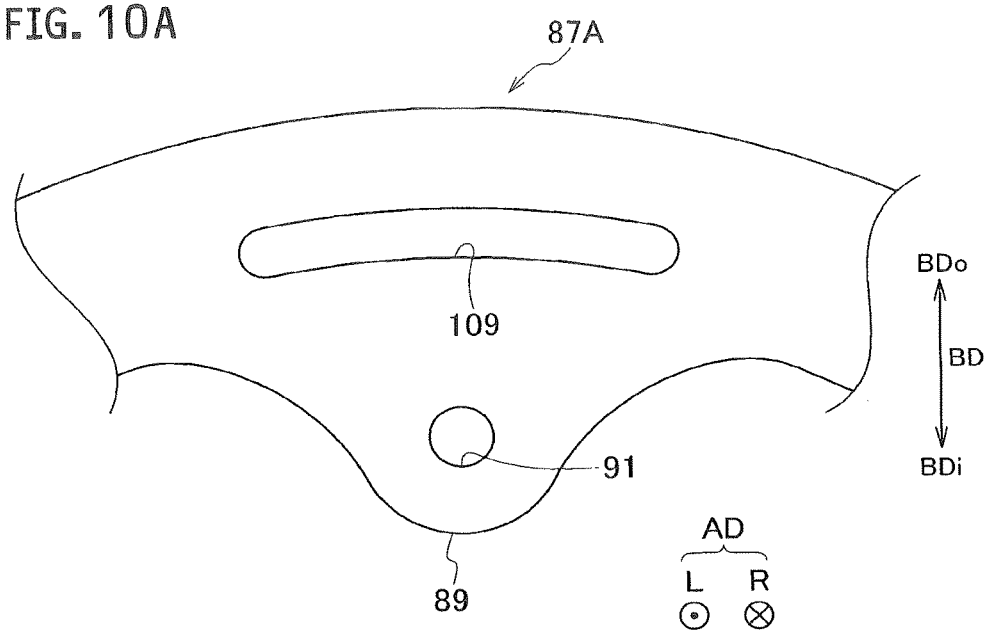
FIG. 10A is an enlarged view of a portion indicated with the arrow X in FIG. 9A.
Figure 10B:
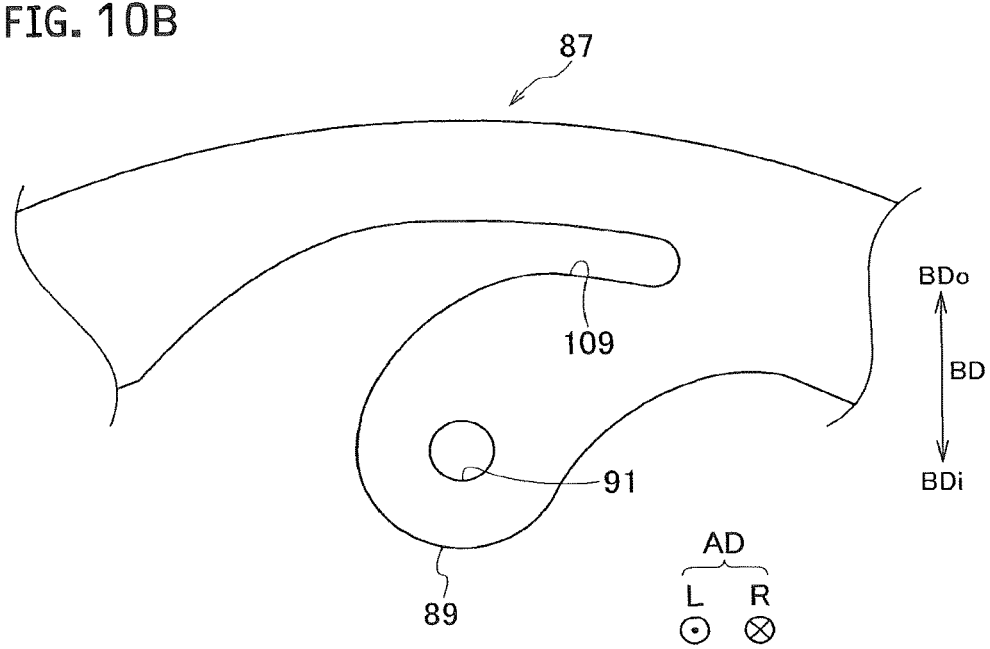
FIG. 10B is a view showing another aspect of the support ring in the variable nozzle unit according to the modified example of the embodiment of the present disclosure.

As shown in FIG. 8, FIGS. 9A and 9B, and FIG. 10A, regarding the support ring 87A, each pin hole 91 in the support ring 87A is formed into a round hole. In addition, a slit 109 for absorbing a difference in thermal expansion in a radial direction, which is attributed to a difference in ambient temperature (a difference in ambient gas temperature) between the first nozzle ring 45 and the support ring 87 when the variable geometry turbocharger 1 is in operation, is formed on an outer side in the radial direction of each pin hole 91 in the support ring 87A. Each slit 109 extends in the circumferential direction. Meanwhile, as shown in FIG. 10B, one end portion of each slit 109 in the support ring 87A may be opened to (made continuous to) an inner edge portion side of the support ring 87A. Further, in addition to the formation of the slit 109 on the outer side in the radial direction of each pin hole 91 in the support ring 87A, another slit (not shown) may be formed on an inner side in the radial direction of each pin hole 91 in the support ring 87A. Note that the position to form the slit 109 in the support ring 87A is not limited to the outer side in the radial direction or the inner side in the radial direction of each pin hole 91, but can be changed to a different position as long as the position corresponds to each pin hole 91. Similarly, the length, width, and shape of each slit 109 in the support ring 87A can also be changed as appropriate.

According to the modified example of the embodiment of the present disclosure, the slit 109 as the absorbing unit is formed at the position corresponding to each pin hole 91, the position such as the outer side in the radial direction of each pin hole 91 in the support ring 87A. Thus, if a difference in thermal expansion in the radial direction occurs between the first nozzle ring 45 and the support ring 87A when the variable geometry turbocharger 1 is in operation, it is possible to absorb the difference in thermal expansion in the radial direction between the first nozzle ring 45 and the support ring 87A. For example, when the slit 109 is formed on the outer side in the radial direction of each pin hole 91 in the support ring 87A, the difference in thermal expansion in the radial direction between the first nozzle ring 45 and the support ring 87A can be absorbed while sufficiently maintaining rigidity of the entire support ring 87A. As a consequence, when the variable geometry turbocharger 1 is in operation, it is possible to sufficiently suppress the thermal deformation of the first nozzle ring 45 such that the opposed surface of the first nozzle ring 45 is inclined with respect to the direction perpendicular to the axial direction.

Accordingly, the modified example of the embodiment of the present disclosure can achieve the effect similar to that of the embodiment of the present disclosure described above.

It is to be noted that the present disclosure is not limited to the embodiment described above but can be embodied in various other aspects. In addition, the scope of rights encompassed by the present disclosure is not limited to these embodiments.

What is claimed is:

1. A variable nozzle unit configured to adjust a passage area for an exhaust gas to be supplied to a turbine wheel side of a variable geometry turbocharger, comprising:

an annular first wall member disposed inside a turbine housing of the variable geometry turbocharger and concentrically with the turbine wheel;

an annular second wall member provided integrally with the first wall member at a position located away from and opposed to the first wall member in an axial direction, by using a plurality of connecting pins arranged at intervals in a circumferential direction;

a plurality of variable nozzles disposed between an opposed surface of the first wall member and an opposed surface of the second wall member at intervals in the circumferential direction, each variable nozzle being turnable in forward and reverse directions around a shaft center parallel to a shaft center of the turbine wheel;

a link mechanism that is movable in engagement with the annular first wall member or the annular second wall member and configured to synchronously turn the plurality of variable nozzles; and a support ring being connected to the first wall member by joining of one end portions of the plurality of connecting pins, the support ring including a plurality of pin holes to allow insertion of the one end portions of the plurality of connecting pins, respectively, the pin holes being penetratingly formed in at intervals in the circumferential direction, wherein each pin hole in the support ring is formed into an elongated shape extending from an inner edge portion side toward an outer edge portion side of the support ring, and the support ring relatively moves the plurality of connecting pins along the elongated shape of each pin hole and absorbs a difference in thermal expansion in a radial direction between the first wall member and the support ring when the variable geometry turbocharger is in operation.

2. The variable nozzle unit according to claim 1, wherein a washer is provided between a rim of each pin hole in the support ring and a joining portion brought about by joining of the one end portion of the corresponding connecting pin.

3. The variable nozzle unit according to claim 1, wherein each pin hole is a slit.

4. The variable nozzle unit according to claim 1, wherein
a plurality of support holes are penetratingly formed in the first wall member at intervals in the circumferential direction,
a nozzle shaft of each variable nozzle is turnably supported by a corresponding one of the support holes in the first wall member, and
an opposite surface side from the opposed surface of the first wall member communicates with a turbine scroll passage of the turbine housing.

5. A variable geometry turbocharger configured to supercharge air to be supplied to an engine side by using energy of an exhaust gas from the engine, comprising:
the variable nozzle unit according to claim 1.

6. The variable nozzle unit according to claim 1, wherein a shape of each pin hole in an oval shape.

7. The variable nozzle unit according to claim 1, wherein a shape of each pin hole is an elongated hole shape with two parallel long sides.

* * * * *